July 28, 1931.  J. GRADL  1,816,770
WELDED SPIGOT AND SOCKET JOINT
Filed May 24, 1926
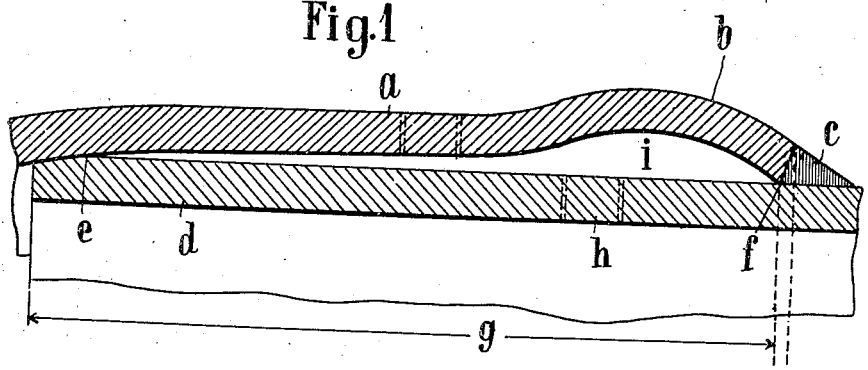
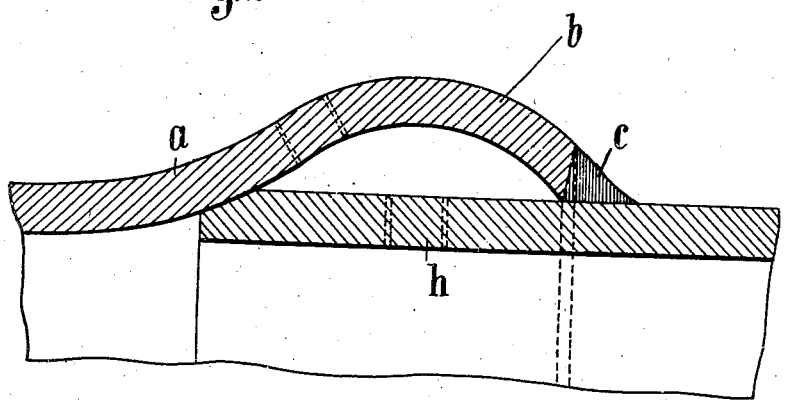
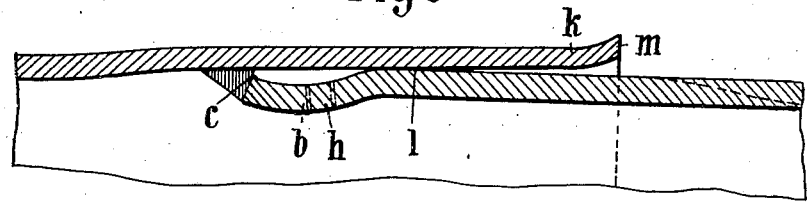
INVENTOR
JOSEF GRADL
BY HIS ATTORNEYS
Howson and Howson Patented July 28, 1931

1,816,770

UNITED STATES PATENT OFFICE

JOSEF GRADL, OF HUCKINGEN-ON-THE-RHINE, GERMANY, ASSIGNOR TO THE FIRM MANNESMANNROHREN-WERKE, OF DUSSELDORF, GERMANY

WELDED SPIGOT AND SOCKET JOINT

Application filed May 24, 1926, Serial No. 111,451, and in Germany May 27, 1925.

In spigot and socket joints of a known kind for pipes the socket was sealed with lead wool, tarred hemp rope and the like. Such joints took a considerable time to make and frequently became leaky, a circumstance which caused great losses in the case of gas mains. For this reason in place of these spigot and socket joints pipes have been butt-welded together. Welded spigot and socket joints have also been used to some extent. In the case of smooth pipes grooves have been impressed in the wall of the pipe close to the weld, to allow for the strains due to shrinkage in the material. It has been found that with welded spigot and socket joints, considerable bending stresses occur which endanger the weld and are a frequent cause of broken connections and leakages. Since, in making the welded joint, the protective layer usually provided on the pipes is destroyed round about the place of junction, it has been found that considerable corrosion through rust and the like results.

The drawbacks of the known welded spigot and socket joints are overcome by the present invention, through the socket being provided with a corrugation or double flange as a means compensating for the strains caused by the welding operation. This corrugation or the like may be used both for welded external and internal sockets.

In welded sockets of a known kind it has already been proposed to provide a bulge behind the edge of the socket. This bulge was provided with a filling of iron or steel shavings or the like, which serve for welding and are intended to replace the usual added metal. While in this joint it was not possible to correct the strains caused by the welding operation, as the hollow space in the socket was filled up, this is effected in a satisfactory manner by the hollow space provided according to the present invention.

For relieving the weld of stresses the inserted pipe end is supported independently. The formation of rust is prevented by rust-protecting means being introduced into the hollow space formed by the corrugation and the like.

The invention is illustrated in the accompanying drawings, wherein—

Figure 1 is a longitiudinal section of part of a welded joint according to the invention, Fig. 2 is a similar view of a slightly different type of joint, and Fig. 3 is a similar view of still another form of the invention.

Refering now particularly to Figure 1, the following will be seen:

The socket $a$ is provided with a corrugation $b$. The weld is made at $c$. The weld may be an autogenous or an electric one. In order to protect the weld from being subjected to bending stresses, the smooth end $d$ of the inserted pipe is introduced into the socket $a$ and caused to bear closely at the places $e$ and $f$. The lap $g$ may be made any suitable depth according to the load on the line of piping. In the cases of pipes which are not highly stressed and are well supported the lap need be no deeper than the corrugation as shown in Fig. 2. In making the joint, the pipe end $d$ which is bevelled off to fit the conical surface of the socket is introduced into the socket $a$. The opened corrugation is heated and then bent down and welded at $c$ to the pipe. Any strains due to shrinkage when cooling are readily taken up by the corrugation $b$.

In order to eliminate the danger of rusting due to the burning away of the coating of anti-rust composition, the pipe end $d$ is provided with one or more holes $h$, in order that after the joint has been made the hollow space $i$ may be filled by having asphalt or cement sprayed or pressed into it. Similar holes may also be provided as indicated in the socket or its corrugation. After the asphalt or cement has been introduced, the holes may be closed again by means of screws. The holes $h$ really constitute normally closed ports, for they are opened only to permit filling of the hollow space $i$ with anti-rust composition, and are immediately closed thereafter.

Fig. 3 shows a similar arrangement for an internal socket. The end of the inserted pipe provided with the corrugation $b$ is lightly driven into the slightly flared socket $k$ so as to bear at $l$. Thereupon the end of the corrugation is welded autogenously or electrically to the socket. In this case as well the corrugation $b$ will take up the strains due to shrinkage. To allow for the pipes not being truly round, the end of the socket is flared at $m$. In order that the cross-section of the pipes shall not be reduced at any point, the two pipe ends may be expanded. Holes $h$ for introducing an anti-rust agent may be provided in this case as well.

I claim:

A pipe joint comprising a socket, a spigot adapted to be introduced into said socket, said spigot contacting the wall of the socket at the outer end of the socket and at a point remote from the end of said socket, and a weld uniting said socket end and said spigot, the socket being corrugated between the points of contact to form a hollow space between said socket and spigot, said corrugation being adapted to act as an equalizing means for taking up the strain caused by the welding operation.

In testimony whereof I have signed my name to this specification.

JOSEF GRADL.